US010676047B1

(12) United States Patent
Santilli et al.

(10) Patent No.: US 10,676,047 B1
(45) Date of Patent: Jun. 9, 2020

(54) WIRE HARNESS MOUNTING ASSEMBLY

(71) Applicant: DENSO International America, Inc., Southfield, MI (US)

(72) Inventors: Ercole Santilli, Chesterfield, MI (US); Ross Mischnick, Grosse Pointe Park, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/355,063

(22) Filed: Mar. 15, 2019

(51) Int. Cl.
*B60R 16/02* (2006.01)
*H02G 3/04* (2006.01)

(52) U.S. Cl.
CPC ....... *B60R 16/0215* (2013.01); *H02G 3/0456* (2013.01)

(58) Field of Classification Search
CPC ............ B60R 16/0215; B60R 16/0207; H02G 3/0456; H02G 11/00; H02G 3/32; H01B 7/04; H01B 7/041; H01B 7/0045; H01B 7/40; F16L 3/233
See application file for complete search history.

(56) References Cited

U.S. PATENT DOCUMENTS

| | | | | |
|---|---|---|---|---|
| 3,448,346 | A | * | 6/1969 | McHaffie ............. H02G 11/006 361/827 |
| 4,700,913 | A | * | 10/1987 | Hirano ................ B60R 16/0215 24/543 |
| 6,109,569 | A | * | 8/2000 | Sakaida ................... F16L 3/222 248/316.7 |
| 2005/0133253 | A1 | * | 6/2005 | Terada ................... H01R 13/60 174/260 |
| 2007/0205015 | A1 | * | 9/2007 | Ide ....................... B60R 16/0207 174/72 A |
| 2010/0200289 | A1 | * | 8/2010 | Neuber ................... F16L 3/015 174/40 R |

FOREIGN PATENT DOCUMENTS

| | | |
|---|---|---|
| JP | 8079948 A2 | 3/1996 |
| KR | 200271270 Y1 | 4/2002 |

OTHER PUBLICATIONS

English Translation Mori JP2001-97147 (Year: 2001).*
English Translation Suzuki et al. JP2009056911 (Year: 2009).*
STIC search report (Year: 2019).*

* cited by examiner

*Primary Examiner* — Steven T Sawyer
(74) *Attorney, Agent, or Firm* — Harness, Dickey & Pierce, P.L.C.

(57) ABSTRACT

A wire harness mounting assembly includes a housing and a clip assembly. The housing has at least one bracket, and the clip assembly has an arm. The clip assembly is supported by the at least one bracket of the housing. The arm includes a plurality of segments connected by a hinge such that the arm folds in alternating directions into a spring configuration.

15 Claims, 3 Drawing Sheets

WIRE HARNESS MOUNTING ASSEMBLY

FIELD

The present disclosure relates to a wire harness assembly, and, more specifically, to a wire harness mounting assembly.

BACKGROUND

This section provides background information related to the present disclosure which is not necessarily prior art.

A wire harness can be used in a variety of applications for a variety of different purposes, such as to protect and direct one or more wires between two points. For example, a wire harness can be used to protect and direct wiring extending from an electrical connector to a component in a heating, ventilation, and air conditioning (HVAC) unit configured to direct airflow for heating or cooling a passenger compartment in a motor vehicle. In such an application, it is often desirable to secure the wire harness as close to the HVAC packaging as possible without the wire harness sagging along its length or contacting adjacent components. A wire harness mounting assembly able to provide these advantages would thus be desirable.

SUMMARY

This section provides a general summary of the disclosure, and is not a comprehensive disclosure of its full scope or all of its features.

An example wire harness mounting assembly according to the present disclosure includes a housing and a clip assembly. The housing has at least one bracket, and the clip assembly has an arm. The clip assembly is supported by the at least one bracket of the housing. The arm includes a plurality of segments connected by a hinge such that the arm folds in alternating directions into a spring configuration.

In an example, the at least one bracket may be two brackets disposed to define a channel, the clip assembly being at least partially disposed in the channel and supported by the two brackets.

In an example, each of the two brackets may be an L-shaped bracket having a first leg and a second leg. The second leg of a first of the two brackets may extend toward the second leg of a second of the two brackets.

In an example, the hinge may be a living hinge.

In an example, the clip assembly may include a base attached to the arm by a hinge. The base may include at least one tab housed within a channel defined by the housing.

In an example, the clip assembly may include a clip attached to the arm by a hinge. The clip may have a base and a pair of grippers.

In an example, the base may include at least one cutout, and the at least one bracket may be slideably received within the at least one cutout.

In an example, each of the pair of grippers may include an inwardly extending nub on a free end thereof.

In an example, the at least one bracket may be two brackets disposed to define a channel. The clip assembly may include a base and a clip, where the base may be attached to a first end of the arm and the clip may be attached to a second, opposite, end of the arm. The base and arm of the clip assembly may be disposed within the channel and supported by the at least two brackets. The clip may include a base having a pair of opposing cutouts, where each of the two brackets may be slideably received in one of the pair of opposing cutouts.

An example wire harness assembly according to the present disclosure includes a wire harness and a wire harness mounting assembly. The wire harness mounting assembly further includes a housing having at least one bracket and a clip assembly having an arm. The clip assembly may be supported by the at least one bracket. The clip assembly may engage the wire harness. The arm may include a plurality of segments connected by a hinge such that the arm folds in alternating directions into a spring configuration. The clip assembly may provide constant tension on the wire harness from the spring configuration.

In an example, the at least one bracket may be two brackets disposed to define a channel, and the clip assembly may be at least partially disposed in the channel and supported by the two brackets.

In an example, each of the two brackets may be an L-shaped bracket having a first leg and a second leg, and the second leg of a first of the two brackets may extend toward the second leg of a second of the two brackets.

In an example, the clip assembly may include a clip attached to the arm by a hinge. The clip may have a base with opposing cutouts. The second leg of each of the two brackets may be slideably received within one of the opposing cutouts.

In an example, the hinge may be a living hinge.

In an example, the clip assembly may include a base attached to the arm by a hinge, and the base may include at least one tab housed within a channel defined by the housing.

In an example, the clip assembly may include a clip attached to the arm by a hinge, and the clip may have a base and a pair of grippers.

In an example, the pair of grippers may define a channel receiving the wire harness therein.

In an example, each of the pair of grippers may include a plate and an inwardly extending nub, and the plates and inwardly extending nubs of the pair of grippers may surround a majority of a circumference of the wire harness to secure the wire harness in the channel.

In an example, the base may include at least one cutout, and the at least one bracket may be slideably received within the at least one cutout.

In an example, the at least one bracket may be two brackets disposed to define a channel. The clip assembly may include a base and a clip, where the base may be attached to a first end of the arm and the clip may be attached to a second, opposite, end of the arm. The base and arm of the clip assembly may be disposed within the channel and supported by the at least two brackets. The clip may include a base having a pair of opposing cutouts, with each of the two brackets being slideably received in one of the pair of opposing cutouts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
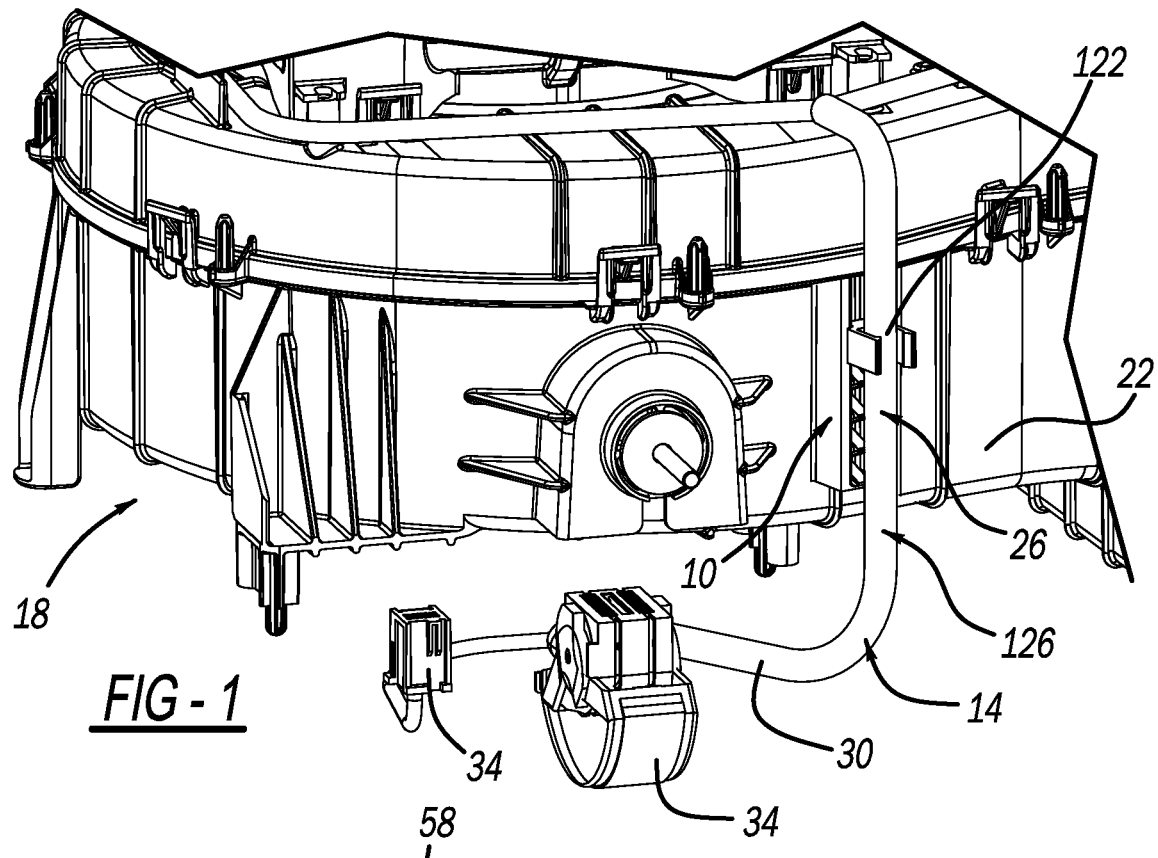
FIG. 1 is a perspective view of an example HVAC assembly, an example wire harness assembly, and an example wire harness mounting assembly according to the present disclosure.
Figure 2:
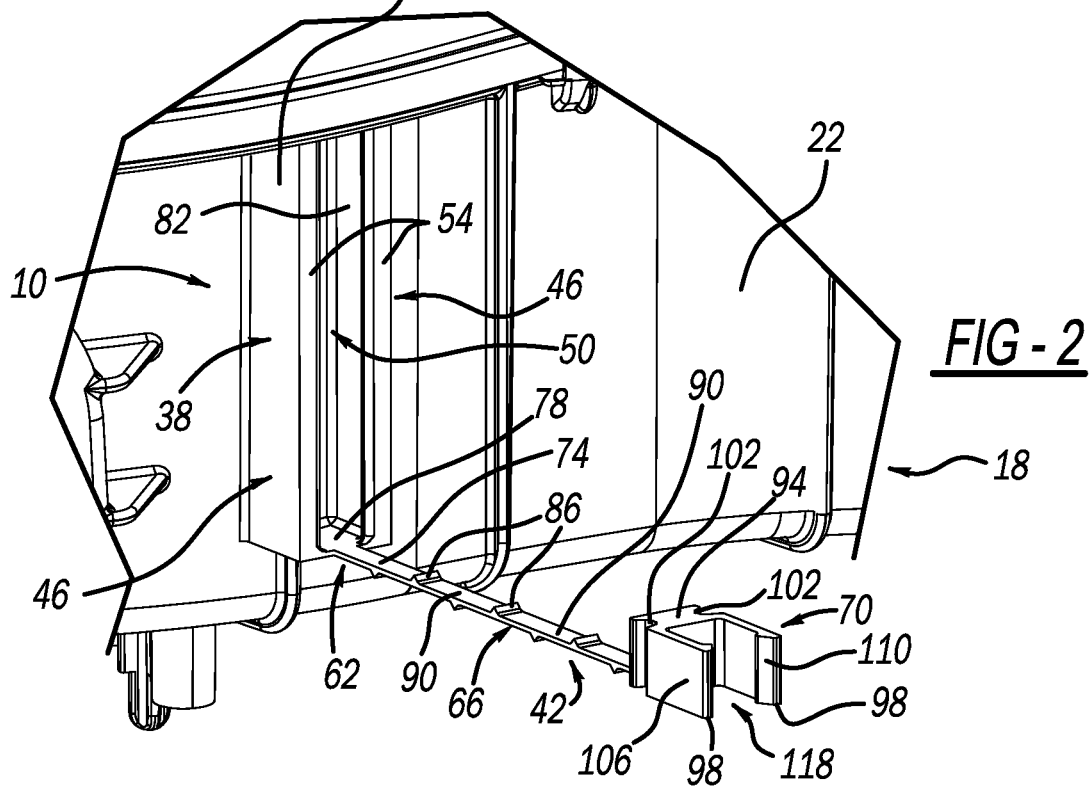
FIG. 2 is a perspective view of a configuration of the wire harness mounting assembly in FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A wire harness can be used in a variety of applications for a variety of different purposes, such as to protect and direct one or more wires between two points. Currently clips may be used to route the wire harness and attach portions of the wire harness to various parts. These clips are stationary and cannot move with respect to the parts.

The wire harness mounting assembly of the present disclosure includes a spring clip that moves dynamically with respect to the part or assembly on which it is mounted to provide constant tension on a portion of a wire harness, or a wire harness branch, of varying length. The constant tension on the wire harness branch prevents the wire harness from making contact with adjacent components in the vehicle. The wire harness mounting assembly saves cost by eliminating additional clips or ties that would otherwise need to be added to the wire harness assembly to prevent branches with excess length from hanging or sagging due to gravity.

Now referring to FIGS. 1-5, a wire harness mounting assembly 10 is illustrated. The wire harness mounting assembly 10 is configured to mount a wire harness 14 proximate to an associated part 18. The wire harness mounting assembly 10 may be fixed to a housing 22 of the associated part 18. For example only, the wire harness mounting assembly 10 may be fixed to a housing 22 of an HVAC assembly 18. The wire harness mounting assembly 10 may be engaged with a portion, or branch, 26 of the wire harness 14. For example only, the wire harness 14 may be an HVAC wire harness.

While the associated part 18 and wire harness 26 are illustrated and described as an HVAC assembly and HVAC wire harness, respectively, it is understood that the associated part 18 and wire harness 26 may be any part and wire harness on a vehicle. The vehicle may be a passenger vehicle or any other suitable vehicle, such as any recreational vehicle, mass transit vehicle, military vehicle, construction vehicle/equipment, watercraft, aircraft, etc.

The wire harness 14 generally includes a flexible tube 30, which is configured to protect and direct wires extending therethrough. For example and as illustrated in FIG. 1, the flexible tube 30 extends from one or more electrical connectors 34 to the HVAC assembly 18 in order to protect wires that extend therethrough and conduct current to power the HVAC assembly 18. The wire harness mounting assembly 10 is configured to direct the flexible tube 30 along the housing 22 and to retain the flexible tube 30 in close proximity to the housing 22, as described further herein.

The wire harness mounting assembly 10 generally includes a housing 38 and a spring clip assembly 42. The housing 38 may further include a pair of brackets 46 disposed facing each other to create a channel, or doghouse, 50 therebetween. The brackets 46 may each be an L-shaped bracket having a short leg 54 and a long leg 58, such that when the brackets 46 are arranged to create the channel 50, the short legs 54 of the brackets 46 extend toward each other.

The brackets 46 may be manufactured from any acceptable material, including, for example, a metal or a polymer. The material selection for the brackets 46 may be driven by the material of the housing 22. For example, in cases where the housing 22 is made of a metal, the brackets 46 may also be made of metal, and in cases where the housing 22 is made of a polymer, the brackets 46 may also be made of a polymer. However, material of the housing 22 does not necessarily have to drive the selection of the material for the brackets 46. For example, in some cases, the housing 22 may be formed of metal while the brackets 46 are formed of a polymer or other material, and vice-versa.

The brackets 46 may be fixed to the housing 22 by any acceptable means. For example, in some examples, the brackets 46 may be welded to the housing 22. In some examples, the brackets 46 may be fixed to the housing 22 by an adhesive. In other examples, the brackets 46 may be integrally formed with the housing 22, such as, for example, by injection molding.

The spring clip assembly 42 may further include a base 62, an arm 66, and a clip 70. The base 62, arm 66, and clip 70 may be integrally formed to create a single, monolithic piece. For example, the base 62, arm 66, and clip 70 may be stamped or molded from a single material, such as a metal, polymer, or other suitable material. Specifically, the base 62, arm 66, and clip 70 may be, for example, injection molded or 3D printed.

The base 62 may be a T-shaped base, having a center segment 74 and outwardly extending arms or tabs 78 on an end of the center segment 74. When the wire harness mounting assembly 10 is assembled, the arms or tabs 78 extend into the channel 50 and engage inner surfaces 82 of the short leg 54 and long leg 58 of each bracket 46.

The center segment 74 may be attached to the arm 66, for example, by a hinge, or living hinge, 86. A living hinge is a flexible hinge or flexure bearing that acts as a bridge, connecting two pieces and allowing them to pivot or rotate relative to one another. The living hinge is made from the same material as the pieces it connects, rather than some other flexible substance. In some examples, the living hinge is thinned or cut to allow the pieces that it connects to bend along the line of the hinge.

The arm 66 may be a molded flap partitioned into a number of segments (for example only, eight segments) 90 connected by hinges, or living hinges, 86. When the wire harness mounting assembly 10 is assembled, the arm 66 is folded and assembled into a vertical orientation to create a spring-like effect once the harness is clipped into the clip 70. To assemble into the vertical orientation, the arm 66 folds at the hinges 86 in a zig-zag, or alternating, pattern, such that the segments 90 overlap one another. The resulting orientation places the clip 70 vertically above the base 62.

Figure 3:
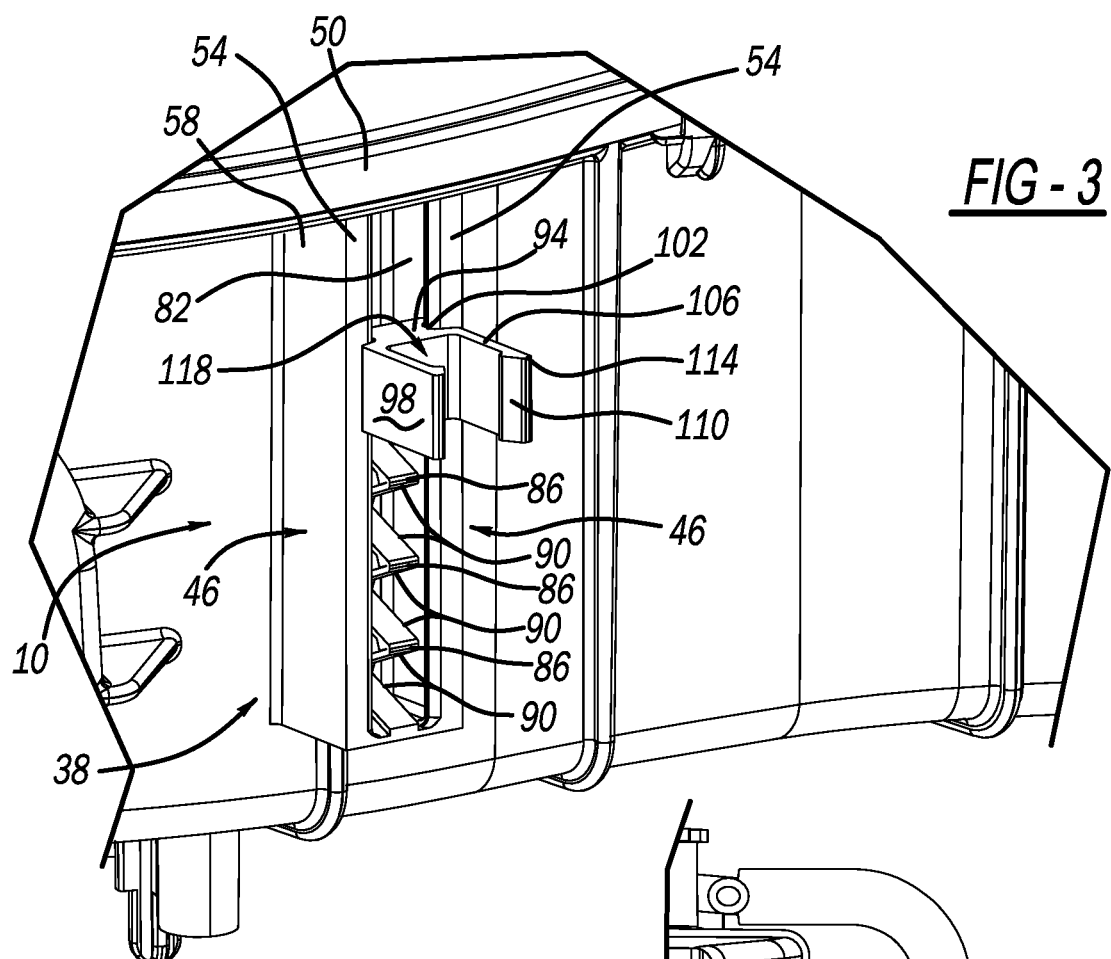
FIG. 3 is a perspective view of another configuration of the wire harness mounting assembly in FIG. 1.
Figure 4:
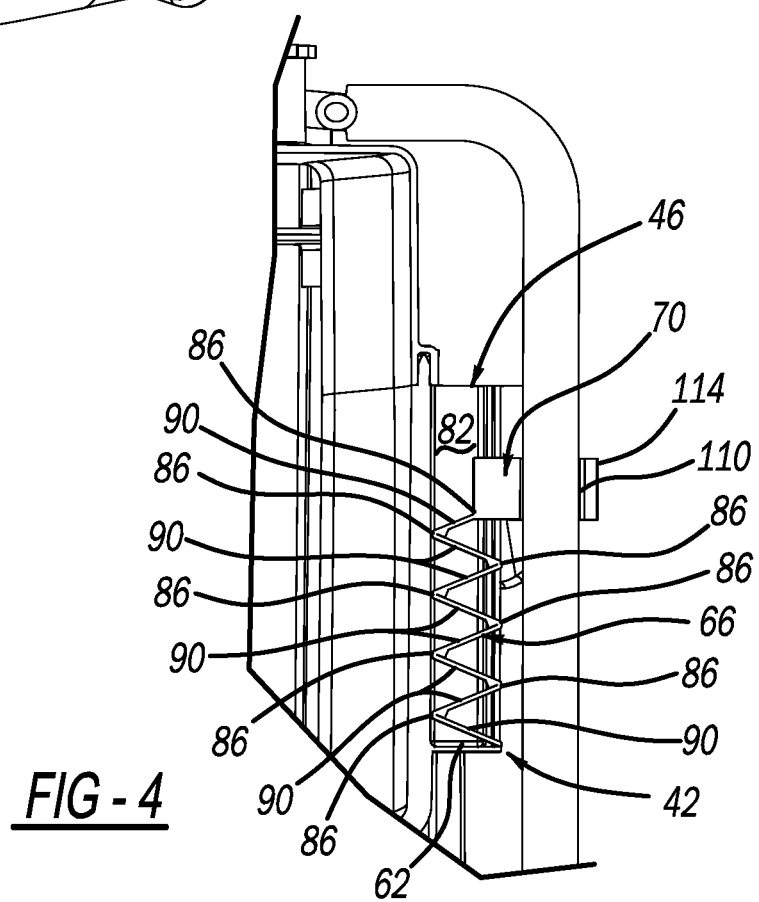
FIG. 4 is a cross sectional view of a portion of the HVAC assembly, a portion of the wire harness assembly, and the wire harness mounting assembly in FIG. 1.
Figure 5:
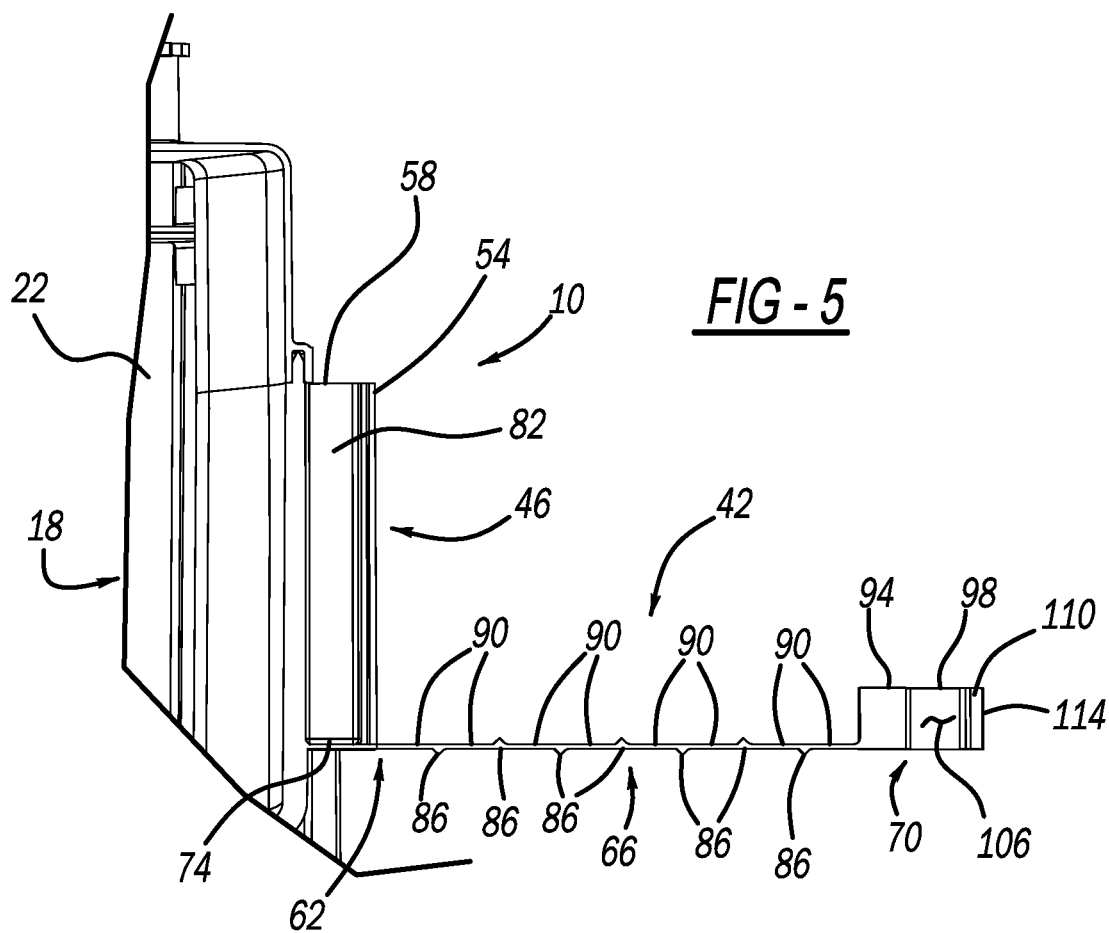
FIG. 5 is another cross sectional view of a portion of the HVAC assembly, a portion of the wire harness assembly, and the wire harness mounting assembly in FIG. 1.

The arm 66 may be attached to the clip 70, for example, by a hinge, or living hinge, 86. The clip 70 may further include a base 94 and two grippers, or extensions, 98 extending from the base 94. The base 94 may include cutouts 102 on opposing sides that engage with the short legs 54 of the brackets 46 (FIG. 3). The short legs 54 of the brackets 46 may be slideably received within the cutouts 102 such that the clip 70 can slide vertically with respect to the brackets 46. The cutouts 102, for example, may be angled, or triangular, or the cutouts 102 may be rounded or squared.

The grippers or extensions 98 may extend from the base 94 in a direction opposite the brackets 46 when the wire harness mounting assembly 10 is assembled. Each gripper 98 may include a plate 106 attached to the base 94 and nubs, or inwardly-extending projections, 110 attached on a free end 114 of the plate 106. The nubs or projections 110 may extend from the free end of the plate 106 toward an opposing nub or projection 110 such that the clip 70 defines a channel 118 for holding the wire harness 14. The nubs or projections 110 may be rounded, pointed, or squared-off. When the wire harness 14 is assembled in the clip 70, the nubs 110 engage and retain the wire harness 14 in the channel 118.

As illustrated in FIG. 1, when the wire harness mounting assembly 10 is assembled and the wire harness 14 is fixed in the channel 118 in the clip 70, a Y-connection, or node, 122 of the wire harness 14 engages with the clip 70 such that the wire harness 14 cannot slide vertically downward with respect to the clip 70. As such, the arm 66 forming the spring keeps a vertical portion, or branch, 126 of the wire harness 14 in constant tension once the connector 34 is terminated into an end device (for example, a blower motor, actuator, ECU, etc.).

Figure 6:
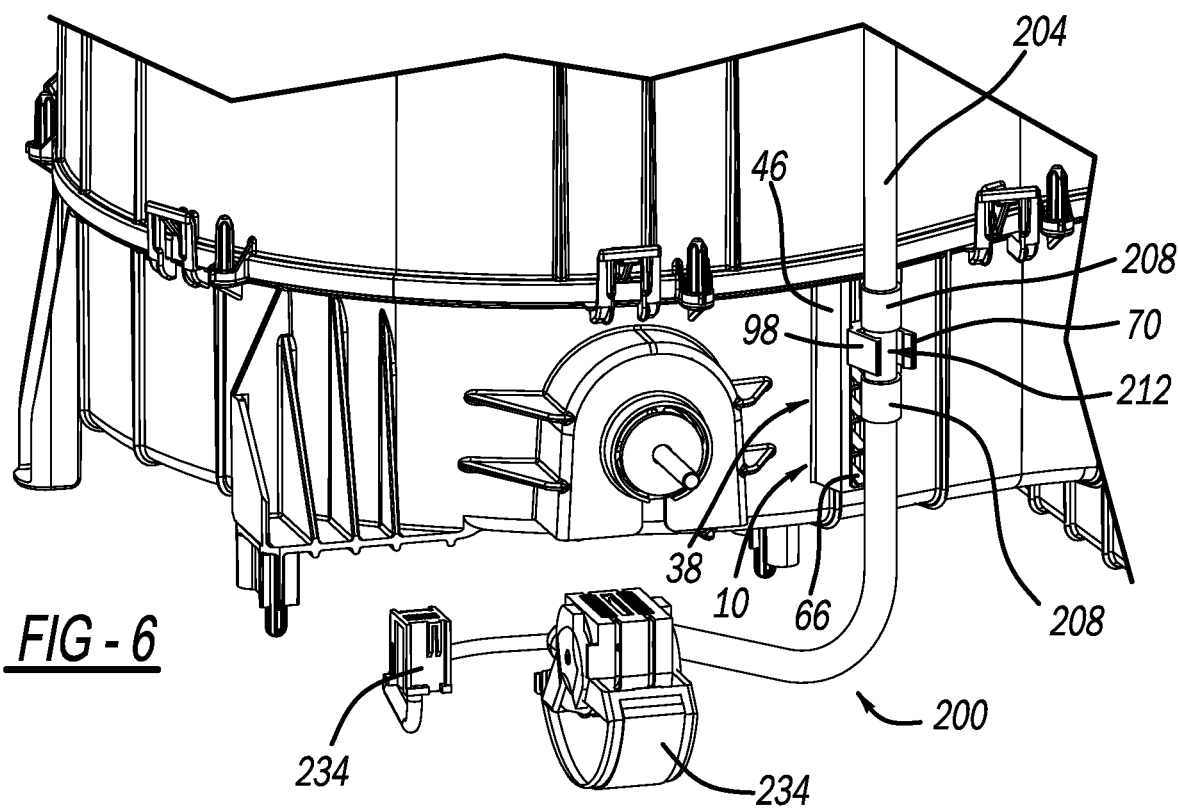
FIG. 6 is a perspective view of another example HVAC assembly, another example wire harness assembly, and another example wire harness mounting assembly according to the present disclosure.

Another example of mounting a wire harness 200 in the wire harness mounting assembly 10 is illustrated in FIG. 6. The wire harness mounting assembly 10 is the same as the wire harness mounting assembly 10, previously described, and is labeled with corresponding numerals. In some examples, a branch 204 of the wire harness 200 may include walls, or barriers, 208 formed thereon, creating a recessed portion 212 therebetween. For example, the walls 208 may be tape, or some other material, wrapped around a flexible tube 230 of the wire harness 200 in two locations to create the recess 212. The walls 208 may also be, for example, flexible (such as rubber or other polymer) rings or tubes placed in two locations on the flexible tube 230 of the wire harness 200.

When the wire harness 200 is assembled in the clip 70, the grippers or extensions 98 are positioned in the recess 212 between the walls 208. As such, the wire harness 200 cannot slide vertically with respect to the clip 70. Therefore, the arm 66 forming the spring keeps the vertical portion, or branch, 204 of the wire harness 200 in constant tension once a connector 234 is terminated into an end device (for example, a blower motor, actuator, ECU, etc.).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wire harness mounting assembly comprising: a housing having at least one bracket; and
a clip assembly having an arm and a clip, the clip being attached to the arm by a hinge, the clip including a base and a pair of grippers, and the base having at least one cutout, the at least one cutout being slideably received within the at least one bracket of the housing, wherein the clip assembly is supported by the at least one bracket, and the arm includes a plurality of segments connected by a hinge such that the arm folds in alternating directions into a spring configuration.

2. The wire harness mounting assembly of claim 1, wherein the at least one bracket is two brackets disposed to define a channel, the clip assembly being at least partially disposed in the channel and supported by the two brackets.

3. The wire harness mounting assembly of claim 2, wherein each of the two brackets is an L-shaped bracket having a first leg and a second leg, the second leg of a first of the two brackets extending toward the second leg of a second of the two brackets.

4. The wire harness mounting assembly of claim 1, wherein the hinge is a living hinge.

5. The wire harness mounting assembly of claim 1, wherein the clip assembly includes a base attached to the arm by a hinge, the base including at least one tab housed within a channel defined by the housing.

6. The wire harness mounting assembly of claim 1, wherein each of the pair of grippers includes an inwardly extending nub on a free end thereof.

7. The wire harness mounting assembly of claim 1, wherein
the at least one bracket is two brackets disposed to define a channel,
the clip assembly includes an assembly base, the assembly base being attached to a first end of the arm and the clip being attached to a second, opposite, end of the arm,
the assembly base and arm of the clip assembly being disposed within the channel and supported by the two brackets, and
the base of the clip having a pair of opposing cutouts, each of the two brackets being slideably received in one of the pair of opposing cutouts.

8. A wire harness assembly comprising: a wire harness; and a wire harness mounting assembly, wherein the wire harness mounting assembly includes a housing having at least one bracket, and a clip assembly having an arm, wherein the clip assembly is supported by the at least one bracket, the clip assembly engages the wire harness, the arm includes a plurality of segments connected by a hinge such that the arm folds in alternating directions into a spring configuration, and the clip assembly provides constant tension on the wire harness from the spring configuration, the at least one bracket is two brackets, the clip assembly being supported by the two brackets, each of the two brackets Is an L-shaped bracket having a first leg and a second leg, the second leg of a first of the two brackets extending toward the second leg of a second of the two brackets, and the clip assembly includes a clip attached to the arm by a hinge, the clip having a base with opposing cutouts, one of the opposing cutouts being slideably received within the second leg of each of the two brackets.

9. The wire harness assembly of claim 8, wherein the two brackets are disposed to define a channel, the clip assembly being at least partially disposed in the channel.

10. The wire harness assembly of claim 8, wherein the hinge is a living hinge.

11. The wire harness assembly of claim 8, wherein the clip assembly includes an assembly base attached to the arm by a hinge, the assembly base including at least one tab housed within a channel defined by the housing.

12. The wire harness assembly of claim 8, wherein the clip includes a pair of grippers.

13. The wire harness assembly of claim 12, wherein the pair of grippers define a channel receiving the wire harness therein.

14. The wire harness assembly of claim 13, wherein each of the pair of grippers includes a plate and an inwardly extending nub, the plates and inwardly extending nubs of the pair of grippers surrounding a majority of a circumference of the wire harness to secure the wire harness in the channel.

15. The wire harness assembly of claim 8, wherein
the two brackets are disposed to define a channel,
the clip assembly includes an assembly base, the assembly base being attached to a first end of the arm and the clip being attached to a second, opposite, end of the arm, and
the assembly base and arm of the clip assembly being disposed within the channel and supported by the two brackets.

* * * * *

UNITED STATES PATENT AND TRADEMARK OFFICE
CERTIFICATE OF CORRECTION

PATENT NO. : 10,676,047 B1
APPLICATION NO. : 16/355063
DATED : June 9, 2020
INVENTOR(S) : Ercole Santilli et al.

It is certified that error appears in the above-identified patent and that said Letters Patent is hereby corrected as shown below:

In the Claims

Column 7, Line 4: In Claim 1, after "comprising:", insert --¶--

Column 7, Line 10: In Claim 1, after "housing,", insert --¶--

Column 7, Line 12: In Claim 1, after "and", insert --¶--

Column 7, Line 47: In Claim 8, after "comprising:", insert --¶--

Column 7, Line 48: In Claim 8, after "and", insert --¶--

Column 7, Line 48: In Claim 8, after "assembly,", insert --¶--

Column 8, Line 1: In Claim 8, after "includes", insert --¶--

Column 8, Line 2: In Claim 8, after "and", insert --¶--

Column 8, Line 2: In Claim 8, after "arm,", insert --¶--

Column 8, Line 4: In Claim 8, after "bracket,", insert --¶--

Column 8, Line 4: In Claim 8, after "harness,", insert --¶--

Column 8, Line 7: In Claim 8, after "configuration,", delete "and"

Column 8, Line 8: In Claim 8, after "configuration,", insert --¶--

Column 8, Line 10: In Claim 8, after "brackets,", insert --¶--

Signed and Sealed this
Twentieth Day of October, 2020

Andrei Iancu
*Director of the United States Patent and Trademark Office*

CERTIFICATE OF CORRECTION (continued)
U.S. Pat. No. 10,676,047 B1

Column 8, Line 10: In Claim 8, delete "Is" and insert --is-- therefor

Column 8, Line 13: In Claim 8, after "and", insert --¶--